United States Patent
Ghafoor

(10) Patent No.: US 9,634,459 B2
(45) Date of Patent: Apr. 25, 2017

(54) GENERATION OF A HIGH POWER PULSE-LASER USING FIELD GENERATED COHERENCE

(71) Applicant: COMSATS Institute of Information Technology, Islamabad (PK)

(72) Inventor: Fazal Ghafoor, Islamabad (PK)

(73) Assignee: COMSATS Institute of Information Technology, Islamabad (PK)

( * ) Notice: Subject to any disclaimer, the term of this patent is extended or adjusted under 35 U.S.C. 154(b) by 0 days.

(21) Appl. No.: 14/844,435

(22) Filed: Sep. 3, 2015

(65) Prior Publication Data
US 2016/0072250 A1   Mar. 10, 2016

Related U.S. Application Data

(60) Provisional application No. 62/046,584, filed on Sep. 5, 2014.

(51) Int. Cl.
| | |
|---|---|
| H01S 3/091 | (2006.01) |
| H01S 3/094 | (2006.01) |
| H01S 3/227 | (2006.01) |
| H01S 1/06 | (2006.01) |

(52) U.S. Cl.
CPC .......... H01S 3/094096 (2013.01); H01S 1/06 (2013.01); H01S 3/227 (2013.01)

(58) Field of Classification Search
CPC .......................... H01S 3/094096; H01S 3/227
See application file for complete search history.

(56) References Cited

U.S. PATENT DOCUMENTS

| | | | |
|---|---|---|---|
| 4,601,036 A | 7/1986 | Faxvog et al. | |
| 4,761,786 A | 8/1988 | Baer | |
| 4,847,850 A | 7/1989 | Kafka et al. | |
| 4,914,663 A | 4/1990 | Basu et al. | |
| 5,408,480 A | 4/1995 | Hemmati | |
| 2016/0013608 A1* | 1/2016 | Krupke ............ | H01S 3/094096 372/5 |

FOREIGN PATENT DOCUMENTS

WO       2012105992       8/2012

OTHER PUBLICATIONS

Ghafoor ("Autler-Townes multiplet spectroscopy", published online via Cornel University Library on arxiv.org, Mar. 21, 2013).*
Ghafoor, "Darkening of a brightened atom and real energy level via field generated coherence", Laser Physics Letters, Oct. 16, 2013, p. 1-7, IOP Publishing.

(Continued)

*Primary Examiner* — Tod T Van Roy
(74) *Attorney, Agent, or Firm* — H.C. Park & Associates, PLC

(57) ABSTRACT

A laser system including a laser cavity, a gain medium disposed in the laser cavity, a pump configured to excite an atom of the gain medium to an excited state, an optical device configured to couple a ground state of the atom of the gain medium to the excited state by applying an optical field to the gain medium, and a microwave device configured to couple the ground state of the atom of the gain medium to a different ground state by applying a microwave field to the gain medium.

17 Claims, 8 Drawing Sheets

(56) References Cited

OTHER PUBLICATIONS

Agassi, "Spontaneous radiative decay of a continuum", Physical Review A, Nov. 1984, p. 2449-2455, vol. 30, No. 5.
Knight, "AC Stark splitting of bound-continuum decays", Journal of Physics B: Atomic and Molecular Physics, 1979, p. 3297-3308, vol. 12, No. 20, Published in Great Britain.
Cardimona et al., "Steady-state quantum interference in resonance fluorescence", Journal of Physics B: Atomic and Molecular Physics, 1982, p. 55-64, Published in Great Britain.
Zhu, et al., "Quantum Interference Effects in Spontaneous Emission from an Atom Embedded in a Photonic Band Gap Structure", Physical Review Letters, Jul. 14, 1997, p. 205-208, vol. 79, No. 2.
Lewenstein et al., "Spontaneous emission of atoms coupled to frequency-dependent reservoirs", Physical Review A, Jul. 15, 1988, p. 808-819, vol. 38, No. 2.
Kocharovskaya et al., "Amplification without inversion: The double-Lamda scheme", Physical Review A, Jul. 1, 1990, p. 523-535, vol. 42, No. 1.
Schleich et al., "Quantum-noise quenching in the correlated spontaneous-emission laser as a multiplicative noise process. I. A geometrical argument", Physical Review A, Feb. 15, 1988, p. 1261-1269, vol. 37, No. 4.
Bergou et al., "Correlated-emission laser: Nonlinear theory of the quantum-beat laser", Physical Review A, Jul. 15, 1988, p. 754-762, vol. 38 No. 2.
Scully, "Correlated Spontaneous-Emission Lasers: Quenching of Quantum Fluctuations in the Relative Phase Angle", Physical Review Letters, Dec. 16, 1985, p. 2802-2805, vol. 55, No. 25.
Paspalakis et al., "Phase Control of Spontaneous Emission", Physical Review Letters, Jul. 13, 1998, p. 293-296, vol. 81, No. 2.
Zhu et al., "Spectral Line Elimination and Spontaneous Emission Cancellation via Quantum Interference", Physical Review Letters, Jan. 15, 1996, p. 388-391, vol. 76, No. 3.
Macovei et al., "Laser Control of Collective Spontaneous Emission", Physical Review Letters, Sep. 19, 2015, p. 123601-1 to 126301-4, vol. 91, No. 2.
Jia-Hua et al., "Spontaneous emission spectra and simulating multiple spontaneous generation coherence in a five-level atomic medium", Physical Review A, Sep. 21, 2006, p. 033816-1 to 033816-8, vol. 74.
Ghafoor et al., "Amplitude and phase control of spontaneous emission", Physical Review A, Jun. 14, 2000, p. 013811-1 to 013811-7, vol. 62.
Lee et al., "Quenching of spontaneous emission via quantum interference", Physical Review A, Jun. 1997, p. 4454-4465, vol. 55, No. 6.
Hakuta et al., "Electric-Field-Induced Second-Harmonic Generation with Reduced Absorption in Atomic Hydrogen", Physical Review Letters, Feb. 4, 1991, p. 596-599. vol. 66, No. 5.
Xia et al., "Experimental Observation of Spontaneous Emission Cancellation", Physical Review Letters, Aug. 5, 1996, p. 1032-1034, vol. 77, No. 6.
Li et al., "Comment on 'Experimental Observation of Spontaneous Emission Cancellation'", Physical Review Letters, Apr. 24, 2000, p. 4016, vol. 84, No. 17.
Ghafoor, "Subwavelength atom localization via quantum coherence in a three-level atomic system", Physical Review A, Dec. 29, 2011, p. 063849-1 to 063849-8, vol. 84.
Ghafoor, "Autler-Townes multiplet spectroscopy", Laser Physics, Feb. 14, 2014, p. 1-19, vol. 24.
Ghafoor, "Autler-Townes triplet spectroscopy: An analytical approach" Optics Communications, Dec. 21, 2010, p. 1913-1919, vol. 284.
Ghafoor et al., "Autler-Townes triplet spectroscopy", Optics Communications, 2007, p. 464-472, vol. 273.
Zho et al., "Generalized n-Photon Resonant 2n-Wave Mixing in an (n+1)-Level System with Phase-Conjugate Geometry", Physical Review Letters, Nov. 10, 2006, p. 193904-1 to 193904-4, vol. 97.
Autler et al., "Stark Effect in Rapidly Varying Fields", Physical Review, Oct. 15, 1955, p. 703-722, vol. 100, No. 2.
Paspalakis et al., "Fluorescence control through multiple interference mechanisms", Physical Review A, Dec. 1998, p. 4868-4877, vol. 58, No. 6.
Chen et al., "Measurements of Optical Phase Variations Using Interfering Multiphoton Ionization Processes", Physical Review Letters, Oct. 1, 1990, p. 1737-1740, vol. 65, No. 14.
Wang et al., "Molecular and Laser Spectroscopy", 1991, Springer-Verlag, Berlin, Germany.
Scully et al., "Quantum Theory of Radiation", "Quantum Optics", 1997, p. 1-10, Cambridge University Press, Cambridge, United Kingdom.
Wolf, "Progress in Optics XXXVI", 1996, p. 245-294, Elsevier Science B.V.
Singh et al., "Lasers: Fundamentals, Types and Operations", 2012, p. 1-34, Wiley-VCH Verlag GmbH & Co. KGaA.
Mompart et al., "Lasing without population inversion: towards X-ray continuous wave laser emission", Contributions to Science, 2000, p. 423-433, vol. 1, No. 4.
Gray et al., "Coherent trapping of atomic populations", Optics Letters, Dec. 1978, p. 218-220. vol. 3 No. 6.
Agarwal, "Quantum Statistical Theories of Spontaneous Emission and their Relation to Other Approaches", 1974, p. 1-129, Published by Springer-Verlag.
Huber et al., "Molecular Spectra and Molecular Structure vol. IV. Constants of Diatomic Molecules", 1979, Published by Van Nostrand Reinhold Company.
Garraway et al., "Cavity modified quantum beats", Physical Review A, Oct. 1996, p. 3592-3602, vol. 54, No. 6.
Knight et al., "The Rabi frequency in optical spectra", Physics Reports, 1980, p. 21-107, vol. 66, No. 2.
Herzberg, "Molecular Spectra and Molecular Structure vol. I. Spectra of Diatomic Molecules", 1950, Published by D. Van Nostrand Company, Inc.
Ferguson et al., "Resonance fluorescence spectra of three-level atoms in a squeezed vacuum", Physical Review A, Sep. 1, 1996, vol. 54, No. 3.

* cited by examiner

GENERATION OF A HIGH POWER PULSE-LASER USING FIELD GENERATED COHERENCE

CROSS-REFERENCE TO RELATED APPLICATION

This application claims priority from and the benefit of U.S. Provisional Patent Application No. 62/046,584, filed on Sep. 5, 2014, which is hereby incorporated by reference for all purposes as if fully set forth herein.

BACKGROUND

Field

Exemplary embodiments relate to a high-power pulse laser using field generated coherence.

Discussion of the Background

Spontaneous emission control and cancellation are fundamentals processes for generating a stable, high-powered laser source in traditional spontaneous generated coherence (SGC). However, a high-powered laser based on SGC requires parallel dipole moments associated with decaying of two nearly non-degenerate closely spaced levels. Moreover, two closely spaced levels are difficult to create due to interference from a static electric field. Thus, simultaneously satisfying the SGC requirements of generating the nearly non-degenerate levels and parallel dipole moments makes it difficult to create a stable, high-powered laser source.

Furthermore, lasers using population inversion require large amounts of energy to pump the gain medium to create a population inversion of two eigenstates. This large amount of energy increases the cost of operating high-powered lasers. In addition, lasers lasing in the high frequency ranges of the electromagnetic spectrum require large amounts of energy to excite atoms of a gain medium to create population inversion of two eigenstates. As a result, these types of laser very difficult to create. Thus, lasers that use less energy are needed to reduce the operating costs and to enable the creation of lasers in high frequency ranges.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a high-powered-pulse laser system using field generated coherence.

Additional aspects will be set forth in the detailed description which follows, and, in part, will be apparent from the disclosure, or may be learned by practice of the inventive concept.

An exemplary embodiment discloses a laser system including a laser cavity, a gain medium disposed in the laser cavity, a pump configured to excite an atom of the gain medium to an excited state, an optical device configured to couple a ground state of the atom of the gain medium to the excited state by applying an optical field to the gain medium, and a microwave device configured to couple the ground state of the atom of the gain medium to a different ground state by applying a microwave field to the gain medium.

An exemplary embodiment also discloses a laser system including a laser cavity, a gain medium disposed in the laser cavity, a pump configured to excite an atom of the gain medium to an excited state, a first laser configured to couple a first ground state of the atom of the gain medium to the excited state by applying a first optical field to the atom of the gain medium, a second laser configured to couple a second ground state of the atom of the gain medium to the excited state by applying a second optical field to the atom of the gain medium, a first maser configured to couple the first ground state of the atom of the gain medium to a third ground state by applying a first microwave field to the atom of the gain medium, and a second maser configured to couple the second ground state of the atom to the gain medium to a first ground state by applying a second microwave to the atom of the gain medium.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
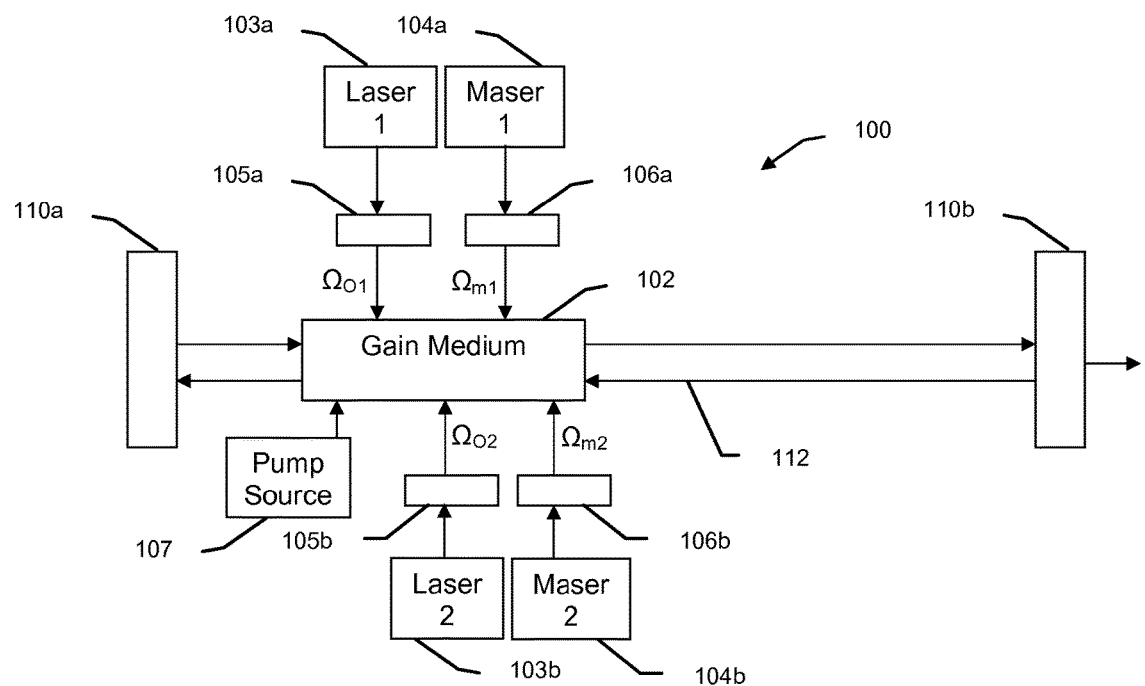
FIG. 1 is a diagram of high-powered laser system according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of devices, parts, elements, components, regions, etc., may be exaggerated for clarity and descriptive purposes. Also, like reference numerals denote like elements.

When an element is referred to as being "connected to," or "coupled to" another element, it may be directly connected to, or coupled to the other element or intervening elements may be present. When, however, an element is referred to as being "directly connected to," or "directly coupled to" another element, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, and/or sections, these elements, components, regions, and/or sections should not be limited by these terms. These terms are used to distinguish one element, component, region, and/or section from another element, component, region, and/or section. Thus, a first element, component, region, and/or section discussed below could be termed a second element, component, region, and/or section without departing from the teachings of the present disclosure.

Spatially relative terms, such as "beneath," "below," "lower," "above," "upper," "next to," "beside" and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Exemplary embodiments provide a stable, extremely high-powered laser system that uses low amounts of operating energy. More specifically, the high-powered laser system may utilize field generated coherence to trap atoms of a gain medium and cause the gain medium to lase without the high energy requirement due to population inversion of the atoms of the gain medium. Exemplary embodiments also provide a stable, high-powered laser system that utilizes field generated coherence, in addition to population inversion of a gain medium, to create extremely high-powered lasers.

A high-power laser system using field generated coherence may use a pump (e.g., a pump laser) to brighten atoms of a gain medium. Various fields (e.g., an optical field) may be applied to the gain medium to darken the brightened atoms and trap almost all of the atom population in a unique excited non-degenerate stable energy-level. In an exemplary embodiment, the laser system includes an alkaline earth element (e.g., sodium ($^{23}$Na) in a Zeeman hyperfine D1 line) that is adjustable with the explored mechanism of the pulse-laser system. With a time-controlled pump-laser, the darkened (lossless) atomic medium (e.g., $^{23}$Na) exhibits may be configured to generate externally-temporal-control of sharp laser pulses similar to a Q-switch. This Q-switch similar process is referred to herein as "a contrast-Q-switch mechanism."

The laser system may include applying various fields (e.g., four fields) in spectral domains shown in FIGS. 6A, 6B, 6D, and 6E. The four spectral domains are associated with decay rates that are slower than meta-stable state. If the laser system is operated in these domains, the laser system may require population inversion through use of the pump laser. In other words, the laser system operated in the domains shown in FIGS. 6A, 6B, 6D, and 6E may not correspond to the operation of the laser system operated in the domains shown in FIGS. 6C and 6F. By introducing these mechanisms, the laser system may be operated in domains of relatively low power at the four different frequencies. The additional operational mode of the system may be called "a Q-switch mechanism", as compared with the contrast-Q-switch mechanism.

Spontaneous emission cancellation and control may be effectively applied in free space (i.e., a vacuum) utilizing atomic coherence and quantum interference. The mechanisms of spontaneous emission cancellation and control may be divided into two main categories.

The first mechanism is spontaneous emission generated coherence (SGC) where the decay processes from excited atoms generate coherence among themselves to cancel spontaneous emission. In particular, a spectral line elimination associated with three dressed states in a four-level atomic system may arise due to a quantum interference effect between two upper decaying non-degenerate levels and a common ground level. Further, a relative phase of two lasers of the same frequency may drive a phase control scheme in a four-level atom for total cancellation of a spectral line out of the three associated unstable dressed-states.

However, spontaneous emission cancellation may be difficult to achieve with SGC because the scheme may require parallel dipole moments associated with decaying of two closely spaced nearly non-degenerate levels. As previously described, two closely spaced levels are difficult to create by mixing two-parity levels due to a static electric field. For example, a separation of $40\gamma$ for $|2s\rangle$ and $|2p\rangle$ states of hydrogen atom could not be achieved.

The second mechanism is field generated coherence (FGC), which depends on a driving field that induces coherence of atoms of the gain medium to cancel spontaneous emission. Unlike the first mechanism, an FGC mechanism is independent of dipole alignment (i.e., dipole movements are not required to be parallel) and thus spontaneous emission cancellation may occur using intensities and phases of the coupling fields. Accordingly, a high-powered laser system of any required level is possible if the system qualifies for total spontaneous emission cancellation under the FGC novel phenomenon.

More specifically, FGC is a collective coherence effect of amplitudes and phases of the driving fields on the spontaneous emission processes during the lasing process of the brightened atom of the gain medium. Using the FGC mechanism, spontaneous emission may be completely cancelled under a field-dependent and dipoles alignment independent trapping condition for the darkening of a brightened atom. The FGC mechanism provides trapping of almost all atoms of the population in a unique excited decaying stable non-degenerate energy level of the selected atom without the use of population inversion of atoms of the gain medium, thereby creating a laser system that may lase under a relatively low amount of energy input.

In an exemplary embodiment, a high-power pulse laser system based on a contrast-Q-switch mechanism using FGC is adjustable to any required power depending on the size of the pumped atomic density and flexibility of other components such as the mirrors. Furthermore, in an exemplary embodiment, a high-powered laser system causes all the atomic population of a gain medium to decay at rate of 100 times less than a natural decay (non-trapped state) rate due to the relative intensities of the driving lasers and masers. Therefore, the lifetime s of the excited states for $^{23}$Na, as an example, may be prolonged to $10^{-6}$/s with the field generated coherence.

In an exemplary embodiment, a laser system may use population inversion and FGC. The high-powered pulse laser system may be a controllable multimode lock-laser system operating under the condition of population inversion and using the slowest decay rate (e.g., $10^{-6}$/s). In an exemplary embodiment, the high-power pulse laser system may be a controllable Q-switch laser system operating under the condition of population inversion and using the slowest decay rate (e.g., $10^{-6}$/s).

FIG. 1 is a diagram of a high-powered laser system according to an exemplary embodiment. Referring to FIG. 1, the laser system may include a laser cavity 100 defined by a first mirror 110a and a second mirror 110b. Although the first mirror 110a and the second mirror 110b are illustrated as plane-parallel, the mirrors may be of any shape or orientation. For example, the first mirror 110a and the second mirror 110b may be one of concentric, confocal, hemispherical, and concave-convex. The laser cavity 100 may include a gain medium 102 disposed between the two mirrors 110a and 110b. The gain medium 102 may be atomic sodium $^{23}$Na.

A pump source 107 may apply energy to the gain medium 102 to excite atoms of the gain medium 102 to create high-powered pulses for the laser system. The pump source 107 may be a laser pump that applies photons to the gain medium 102 to excite atoms to a unique excited meta-stable decaying energy level in order to initiate lasing action under the required conditions of the system. When lasing action occurs, photons 112 resonate between the mirrors 110a and 110b, and eventually exit the laser cavity 100 producing the laser beam pulses.

The high-powered laser system illustrated in FIG. 1, may apply four electromagnetic fields in addition to the pump source 107 to utilize the FGC mechanism. In particular, first laser 103a may apply a first optical field at a first Rabi frequency $\Omega_{O1}$ (hereinafter "first optical field $V_{O1}$") to the gain medium 102 through a first optical phase selector 105a. A second laser 103b may apply a second optical field at a second Rabi frequency $\Omega_{O2}$ (hereinafter "second optical field $V_{O2}$") to the gain medium 102 through a second optical phase selector $\Psi b$. A first maser 104a may apply a first microwave field at a third Rabi frequency $\Omega_{m1}$ (hereinafter "first microwave field $V_{m1}$") to the gain medium 102 through a first microwave phase selector $\Omega a$. A second maser 104b may apply a second microwave field at a fourth Rabi frequency $\Omega_{m2}$ (hereinafter "second microwave field $V_{m2}$") to the gain medium 102 through a second microwave phase selector 106b.

The phase selectors 105a, 105b, 106a, and 106b may be configured to select an appropriate first optical phase, a second optical phase, a first microwave phase, and a second microwave phase of the corresponding electromagnetic driving fields $V_{O1}$, $V_{O2}$, $V_{m1}$ and $V_{m2}$ to satisfy the trapping condition of the gain medium 102, discussed further below. The phase selectors 105a, 105b, 10a, and 106b may also be configured as intensity selectors that select the appropriate intensities of the corresponding electromagnetic driving fields $V_{O1}$, $V_{O2}$, $V_{m1}$, and $V_{m2}$ to satisfy the trapping condition of the gain medium 102. Although not shown, a high-powered laser system may include separate intensity selectors for each electromagnetic driving fields $V_{O1}$, $V_{O2}$, $V_{m1}$, and $V_{m2}$ that are disposed between the respective phases selectors 105a, 105b, 106a, and 106b and the gain medium 102 or between the respective phases selectors 105a, 105b, 106a, and 106b and the respective first laser 103a, second laser 103b, first maser 104a, and second maser 104b. Alternatively, the intensity selectors may be an internal component of the respective first laser 103a, second laser 103b, first maser 104a, and second maser 104. Regardless, a first optical intensity selector may select a first optical intensity, a second optical intensity selector may select a second optical intensity, a first microwave intensity selector may select a first microwave intensity, and a second microwave intensity selector may select a second microwave intensity for the respective driving fields $V_{O1}$, $V_{O2}$, $V_{m1}$, and $V_{m2}$ to satisfy the trapping condition of the gain medium 102 described below.

The first laser 103a may be configured to generate the first optical field $V_{O1}$ at a Rabi frequency of about 3500 MHz to about 7500 MHz. For example, the first laser 103a may be configured to generate the first optical field $V_{O1}$ at a Rabi frequency of 5104.50 MHz. Similarly, the second laser 103b may generate the second optical field $V_{O2}$ at a Rabi frequency of about 35000 MHZ to about 75000 MHz. For example, the second laser 103b may be configured to generate the second optical field $V_{O2}$ at a Rabi frequency of 51104.48 MHz. The first laser 103a may be configured to generate an electromagnetic field that is asymmetric to the electromagnetic field generated by the second laser 103b with or without phase selectors 105a, 105b. The first laser 103a may be configured to generate an electromagnetic field that is symmetric to the electromagnetic field generated by the second laser 103b with or without phase selectors 105a, 105b. In an exemplary embodiment, the electromagnetic fields generated by the first laser 103a and the second laser 103b may pass through respective phase selectors 105a and 105b to provide a first optical field $V_{Ol}$ that is asymmetric or symmetric with the second optical field $V_{O2}$. In addition, the first laser 103a and the second laser 103b may operate in continuous mode.

The first maser 104a may generate the first microwave field $V_{m1}$ at a Rabi frequency of about 500 MHz to about 3000 MHz. For example, the first maser 104a may generate the first microwave field $V_{m1}$ at a Rabi frequency of 1772.7 MHz. The second maser 104b may generate the second microwave field $V_{m2}$ at a Rabi frequency of about 50 MHz to about 300 MHz. For example, the second maser 104b may generate the second microwave field $V_{m2}$ at a Rabi frequency of 177.4 MHz. The first maser 104a may be configured to generate an electromagnetic field that may be asymmetric in phase with the electromagnetic field generated by the second maser 104b with or without phase selectors 106a, 106b. The first maser 104a may be configured to generate an electromagnetic field that may be symmetric in phase with the electromagnetic field generated by the second maser 104b with or without phase selectors 106a, 106b. In an exemplary embodiment, the electromagnetic fields generated by the first maser 104a and the second maser 104b may pass through respective phase selectors 106a and 106b to provide a first microwave field $V_{m1}$ that is asymmetric or symmetric with the second microwave field $V_{m2}$.

Figure 2:
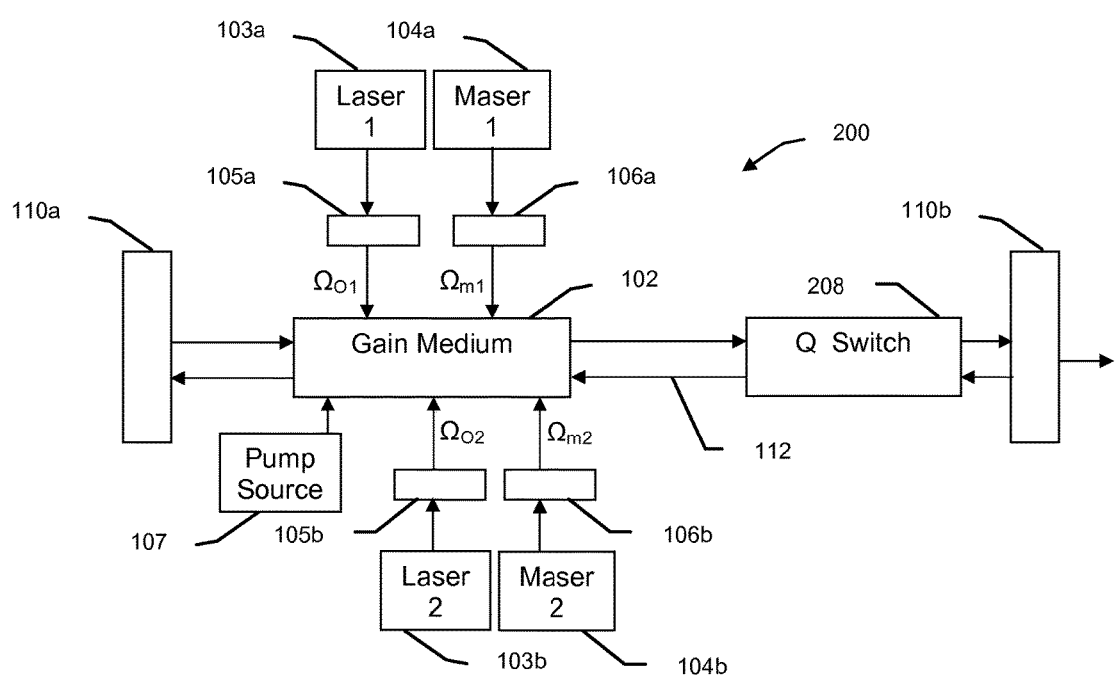
FIG. 2 is diagram of a high-powered laser system using a Q-switch according to an exemplary embodiment.

FIG. 2 is diagram of a high-powered laser using a Q-switch according to an exemplary embodiment. Referring to FIG. 2, the high powered laser Q-switch laser may have a laser cavity 200. Laser cavity 200 may be substantially similar to laser cavity 100, except that laser cavity 200 may include a Q switch 208. The Q-switch 208 may be any suitable Q-switch. In an exemplary embodiment, the Q-switch 208 is an active Q-switch, such as a mechanical device (e.g., a sutter, chopper wheel, spinning mirror, or spinning prism) or a modulator (e.g., an acousto-optic device or an electro-optic device). In an exempalry embodiment, the Q-switch 208 may be a passive Q-switch, such as a saturated absorber. When using the Q-switch 208, population inversion of atoms of the gain medium 102 may occur in addition to the population trapping described above creating an extremely high-powered laser.

In an exemplary embodiment, the Zeeman splitting of the D1 line of the gain medium 102 of atomic sodium may be in lower-frequency ranges. For example, Zeeman splitting of the atoms of the gain medium may occur in the atomic level frequency range of about 0.5 MHz to about 2.8 MHz.

In an exemplary embodiment, Rabi frequency of a pulsed laser ranges from microwaves (e.g., about 10 MHz) to infrared (e.g., about 1 THz). In an exemplary embodiment, the Zeeman splitting of the atoms of the gain medium 102 in the excited state may be about 189 MHz whereas for the ground state it may be about 1772 MHz. As such, the Zeeman splitting in the ground state may be significantly large. However, the Zeeman splitting in the ground state and the Zeeman splitting in the excited state may be in the lower frequency range (or microwave range).

Figure 3:
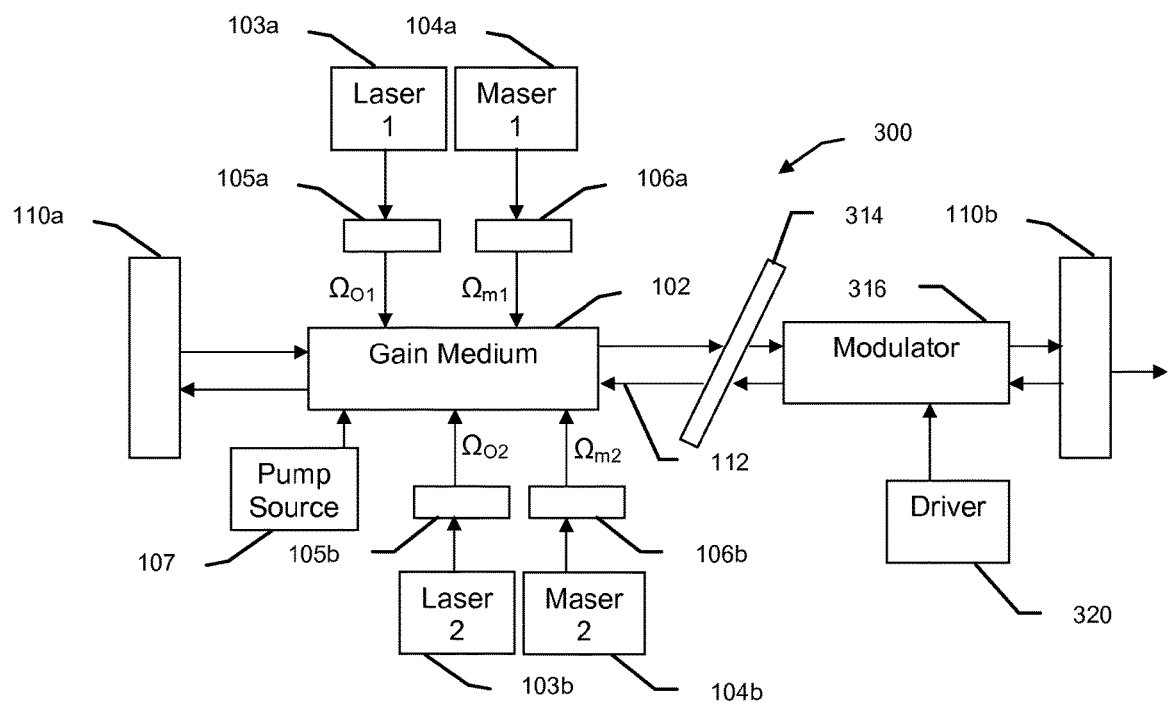
FIG. 3 is a diagram of a high-powered laser system using active mode-locking according to an exemplary embodiment.

FIG. 3 is a diagram of a high-powered laser system using active mode-locking according to an exemplary embodiment. Referring to FIG. 3, the high-powered laser may have a laser cavity 300. Laser cavity 300 may be substantially similar to laser cavity 100, except that laser cavity 300 may include a polarizer 314 and a modulator 316. The modulator may be an electro-optical modulator driven by a driver 320 with external voltage. The modulator 316 may be an acousto-optic modulator driven by a driver 320 with an extrenal electrical signal.

Figure 4:
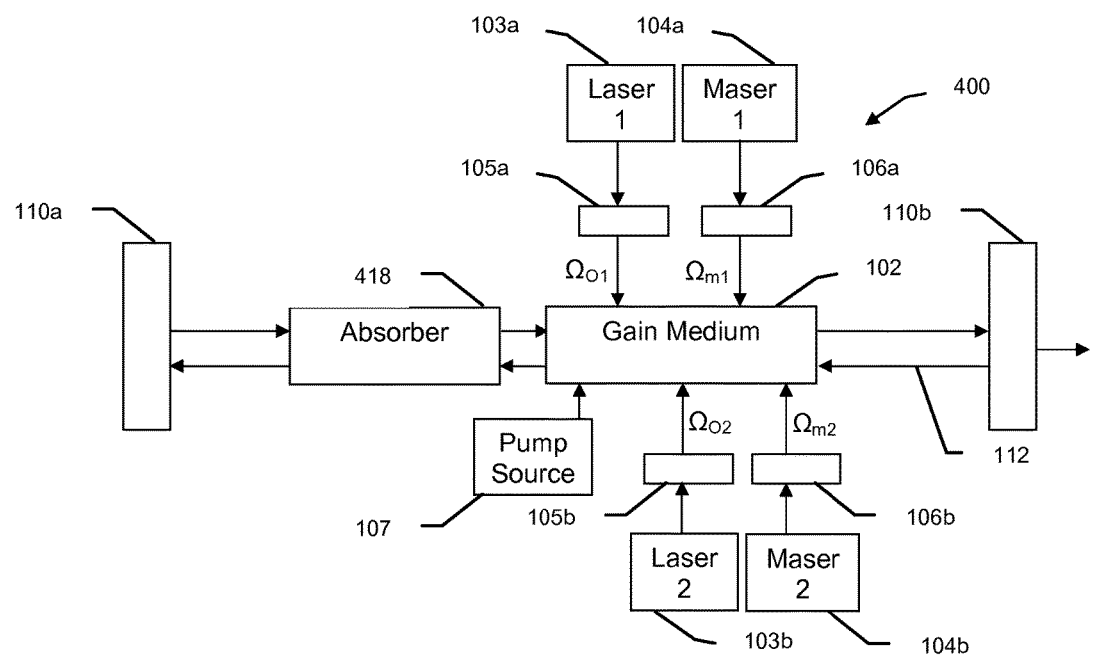
FIG. 4 is diagram a high-powered laser system using passive mode-locking according to an exemplary embodiment.

FIG. 4 is diagram of a high-powered laser system using passive mode-locking according to an exemplary embodiment. Referring to FIG. 4, the high-powered laser may have a laser cavity 400. Laser cavity 400 may be substantially similar to laser cavity 100, except that laser cavity 400 may include an absorber 418. In an exemplary embodiment, the absorber 418 may be a saturated absorber. The saturated absorber may be any suitable saturated absorber, such as a semiconductor saturated absorber mirror or lead sulfide suspended in glass.

Figure 5:
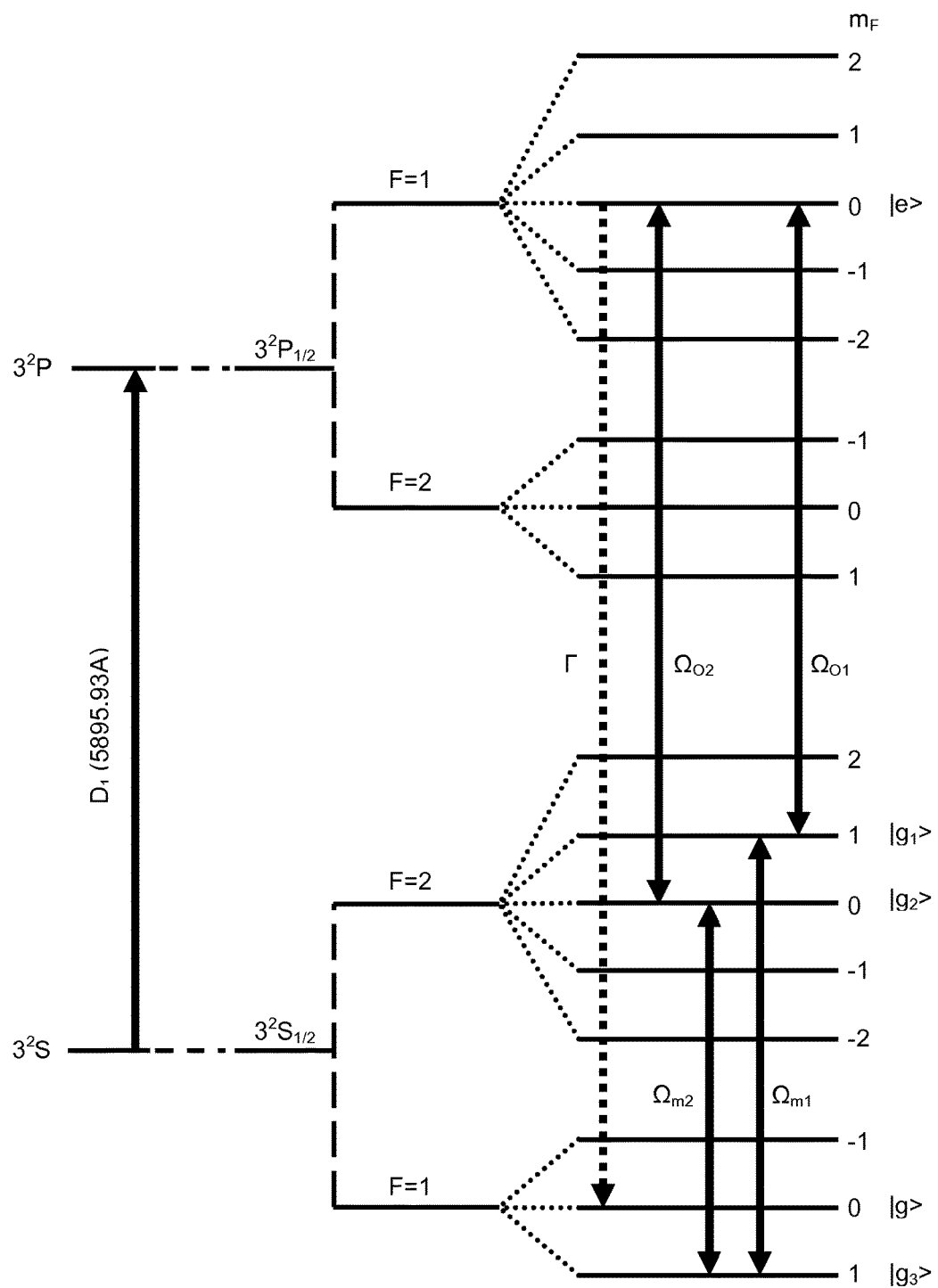
FIG. 5 is a schematic diagram of a Zeeman-structured sodium D1 line interacting with two laser and two masers according to an exemplary embodiment.

FIG. 5 is a schematic diagram of a Zeeman-structured sodium D1 line interacting with two lasers and two masers according to an exemplary embodiment.

Referring to FIG. 5, the laser system may include a gain medium 102 having a five-level atomic system. The five-level atomic system may have an excited state |e> and four ground states $|g_1\rangle$, $|g_2\rangle$, $|g_3\rangle$, and |g>. The gain medium 102 may be an alkaline earth element, such as atomic sodium ($^{23}$Na). The gain medium 102 may be atomic cesium ($^{55}$Cs) or any other material or element in a Zeeman hyperfine D1 line in the earth magnetic field. The gain medium 102 may be hydrogenoids having no complications, such as the atoms of multiple valence electrons that are famous in laboratories due their versatile characteristics in coherent population trapping (CPT). Thus, these materials may be adjustable in the laser system of various exemplary embodiments.

As shown in FIG. 5, an exemplary embodiment of the gain medium 102 may include sixteen energy levels in the D1 line. These energy levels of the gain medium 102 may be as follows. Energy level 1 may be $3^2S_{1/2}$, F=1, $m_F$=1. Energy level 2 may be $3^2S_{1/2}$, F=1, $m_F$=0. Energy level 3 may be $3^2S_{1/2}$, F=1, $m_F$=−1. Energy level 4 may be $3^2S_{1/2}$, F=2, $m_F$=−2. Energy level 5 may be $3^2S_{1/2}$, F=2, $m_F$=−1. Energy level 6 may be $3^2S_{1/2}$, F=2, $m_F$=0. Energy level 7 may be $3^2S_{1/2}$, F=2, $m_F$=1. Energy level 8 may be $3^2S_{1/2}$, F=2, $m_F$=2. Energy level 9 may be $3^2P_{1/2}$, F=2, $m_F$=1. Energy level 10 may be $3^2P_{1/2}$, F=2, $m_F$=0. Energy level 11 may be $3^2P_{1/2}$, F=2, $m_F$=−1. Energy level 12 may be $3^2P_{1/2}$, F=1, $m_F$=−2. Energy level 13 may be $3^2P_{1/2}$, F=1, $m_F$=−1. Energy level 14 may be $3^2P_{1/2}$, F=1, $m_F$=0. Energy level 15 may be $3^2P_{1/2}$, F=1, $m_F$=1. Energy level 16 may be $3^2P_{1/2}$, F=1, $m_F$=2.

In an exemplary embodiment, these sixteen energy levels are simplified into four hyperfine lines. These four hyperfine levels may be as follows. Hyperfine level 1 may be $3^2S_{1/2}$, F=1. Hyperfine level 2 may be $3^2S_{1/2}$, F=2. Hyperfine level 3 may be $3^2P_{1/2}$, F=2. Hyperfine level 4 may be $3^2P_{1/2}$, F=1.

In an exemplary embodiment, the high-powered laser system may be dependent on the linear polarization and the selection rules of the magnetic dipole allowed transitions of the atoms of the gain medium 102. Of the sixteen energy levels, four ground states and one excited may be selected within these energy levels, as shown in FIG. 5. In an exemplary embodiment, the four ground states selected are energy levels 1, 2, 6, and 7, and the excited state selected is energy level 14, as described above. In other words, the ground states may be $3^2S_{1/2}$, F=1, $m_F$=1 (hereinafter, "$|g_3\rangle$"), $3^2S_{1/2}$, F=1, $m_F$=0 (hereinafter, "|g>"), $3^2S_{1/2}$, F=2, $m_F$=0 (hereinafter, "|g2>"), and $3^2S_{1/2}$, F=2, $m_F$=1 (hereinafter, "|g1>") and the excited state may be $3^2P_{1/2}$, F=1, $m_F$=0 (hereinafter, "|e>"). The selected excited state |e> may be a unique excited state for lasing action.

In an exemplary embodiment, the first maser 104a at the first microwave field and at Rabi frequency $\Omega_{m1}$ may couple the first ground state $|g_1\rangle$ of atoms of the gain medium 102 to the third ground state $|g_3\rangle$. The second maser 104b at the second microwave field and at Rabi frequency $\Omega_{m2}$ may couple the second ground state $|g_2\rangle$ of atoms of the gain medium 102 to the third ground state $|g_3\rangle$. The first ground state $|g_1\rangle$ of atoms of the gain medium 102 may also be coupled to the excited decaying state $|e_2\rangle$ by the first laser 103a at the first optical field and at Rabi frequency $\Omega_{O1}$. The second ground state $|g_2\rangle$ of atoms of the gain medium 102 may also be coupled to the excited decaying state |e> by the second laser 103b at the second optical field and at Rabi frequency $\Omega_{O2}$.

In an exemplary embodiment, the excited state |e> is dipole allowed to decay to the fourth ground state |g>. Although the exact mechanism is unknown, the excited state |e> may be coupled to the four ground state through vacuum fields Γ. In an exemplary embodiment, almost the entire atom population of the gain medium 102 may be trapped in the real excited non-degenerated energy state |e> of the sodium D1 line. The atom population of the gain medium 102 may remain trapped until the trapping condition is met and by the various fields and is continuously applied by those fields.

In an exemplary embodiment, the laser system may include the pump 107 configured to excite atoms from the fourth ground state |g> of the gain medium 102 to the excited state |e>. The pump may be a laser pump and may be configured to create high-powered pulses for the high-powered laser system.

It is noteworthy that the order of the energy levels in the laser system is not important as long as the atom field interaction is considered resonantly. Further, according to the selection rules of Zeeman splitting, one of the optical linkages (either the first optical field $\Omega_{O1}$ or the second optical field $\Omega_{O2}$) may be dipole forbidden. Nevertheless, there are experimental methods where the linkages between the dipole forbidden transitions may be allowed by applying a small-strength magnetic field to the gain medium 102. For example, a magnetic field of 1.2 mT may be applied to an alkaline earth element as the gain medium 102 to allow a normally forbidden dipole movement. The involvement of one decay process in this system enables the darkening of the atoms of the gain medium 102 with very small losses. By controlling the phases of optical fields (e.g., from the first laser 103a and second laser 103b) and the microwave fields (e.g., from first maser 104a and the second maser 104b), the pump source 107 may trap almost the entire population of the atoms of the gain medium 102 in the unique excited state.

Different domains of the high power laser oscillation

In an exemplary embodiment, the operation mechanism of a high-powered pulse-laser system may be based on the field generated coherence trapping condition of the gain medium 102. This trapping condition of the gain medium 102 may depend on the parameters of the driving laser fields and the driving maser fields. More specifically, the trapping condition of the gain medium 102 may depend on the intensities and phases of the driving laser fields and the driving maser fields. The intensities and phases of the driving laser fields and the driving maser fields may be externally controllable. Although the intensities of the two optical and microwave fields should satisfy Equation 1 (below) asymmetric phases may be used for the two optical fields and symmetric phases may be used for the two microwave fields for trapping the pumped atoms of the gain medium. Alternatively, symmetric phases may be used for the two optical fields and asymmetric phases may be used for the two microwave fields for trapping the pumped atoms of the gain medium.

In an exemplary embodiment, the trapping condition of the gain medium 102 is characterized by Equation 1:

$$\delta_c(|\Omega_{O1}| |\Omega_{m1}|e^{i\phi 3}+|\Omega m2| |\Omega_{O2}|e^{-i\phi 2})=0 \quad \text{(Equation 1)}$$

where the Rabi frequencies $\Omega_{O1}$, $\Omega_{o2}$, $\Omega_{m1}$, and $\Omega_{m2}$ are directly proportional to the intensities of the first optical field $V_{O1}$, the second optical field $V_{O2}$ with the frequency $\Omega_{O2}$, the first microwave field $V_{m1}$, and the second microwave field $V_{m2}$ respectively. The phase of the first optical field $V_{O1}$ is represented by $\phi 3$ whereas $\phi 2$ the phase is associated with the second optical field $V_{O2}$ and "i" is a particular state. The condition for the pumped atoms of the gain medium 102 to trap the pumped atoms of the gain medium 102 requires satisfying Equation 1 and asymmetric phases of the two optical fields. Thus, $\phi 2$ is 0 when $\phi 3$ is $\pi$, $\phi 2$ is $\pi$ when $\phi 3$ is 0.

In an exemplary embodiment, the phases of the two optical fields are asymmetric and the phases of the two microwave fields are symmetric. For example, when the phases of the optical fields are asymmetric, the phases of the microwave fields are kept at $\pi/2$ or $3\pi/2$ to satisfy the trapping condition. In an alternate exemplary embodiment, the phases of the two optical fields are symmetric and the phases of the two microwave fields are asymmetric. For example, when the phases of the microwave fields are asymmetric, the phases of the optical fields are kept at $\pi/2$ or $3\pi/2$ to satisfy the trapping condition. In an exemplary embodiment, the intensity of the two optical laser fields and the two masers are selected to satisfy Equation 1 along the above stated phase conditions.

FIGS. 6A, 6B, 6C, 6D, 6E, and 6F are spectral profiles of various domains of the gain medium 102 under of a high-powered laser system according to various exemplary embodiments. FIGS. 6A, 6B, 6C, 6D, 6E, and 6F illustrate different domains of the gain medium 102 of a laser system with two masers and two lasers, where the phases and intensities of the electromagnetic fields of the two masers and two lasers may be different. FIGS. 6A-6F are described in the units of $S(\delta_c)$ (in units of $\Gamma^{-1}$) versus $\delta_c$ ($\delta_c=\omega_{eg}-\nu$). The total atomic population decay rate for atomic sodium D1 line is 9.89 MHz. Thus, the radioactive decay rate $\Gamma$ is 9.89 MHz. The separation between the hyperfine ground states F=1 and F=2 is 1772 MHz. The Zeeman splitting further creates five sub-states with different magnetic quantum numbers $m_F$ with frequency differences of 0.699 MHz between each adjacent state. Thus, $\omega_{eg}$ is the frequency difference between the excited state |e> and a particular ground state (i.e., one of |g>, |g$_1$>, |g$_2$>, and |g$_3$>). For example, $\omega_{eg}$ is the optical range (e.g., 3500 MHz to about 7500 MHz) ±0.699 MHz. $\nu$ is the frequency due to the continuum of modes caused by infinite field modes of vacuum fluctuation in a cavity of some volume. It is important to note that spontaneous emission is caused by these vacuum fluctuations.

In an exemplary embodiment, a high-powered pulse laser system may be externally operative in the following different domains where the laser oscillation appears in the optical ranges.

Laser Oscillation in the Darkened Atomic Domain

In an exemplary embodiment, a laser system operates a gain medium 102 under the conditions of Equation 2:

$$|\Omega_{O1}| |\Omega_{m1}|=|\Omega_{m2}| |\Omega_{O2}| \quad \text{(Equation 2)}$$

Using asymmetric phases of the driving fields (e.g., a system with optical fields as asymmetric or a system with microwave fields as asymmetric) in a pulse laser system is system genuinely new. In an exemplary embodiment, the control of the driving fields and their phases for pulse laser oscillation may be external to the laser cavity 100.

Figure 6A:
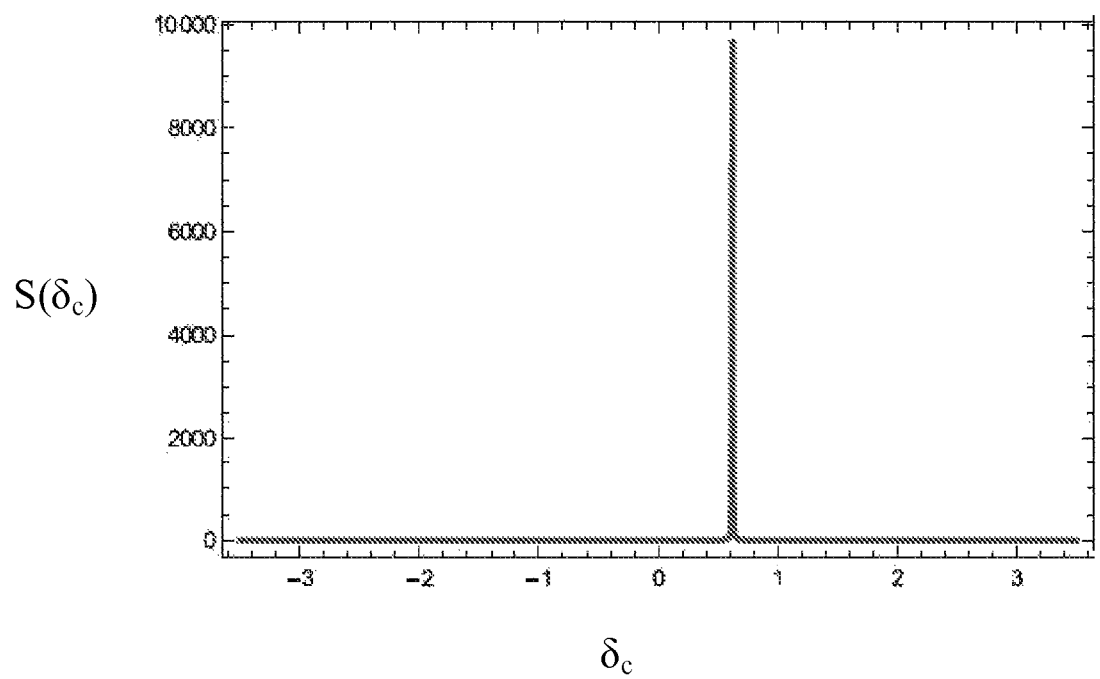
FIG. 6A, FIG. 6B, FIG. 6C, FIG. 6D, FIG. 6E, and FIG. 6F illustrate spectral profiles of atoms of the gain medium of a high-powered laser system according to various exemplary embodiments.
Figure 6B:
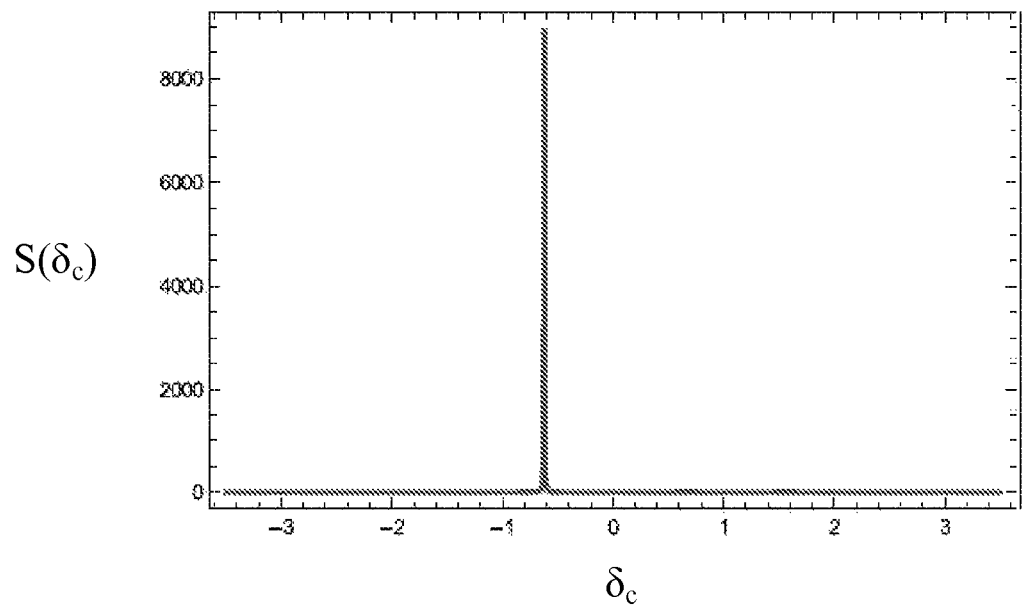
Figure 6C:
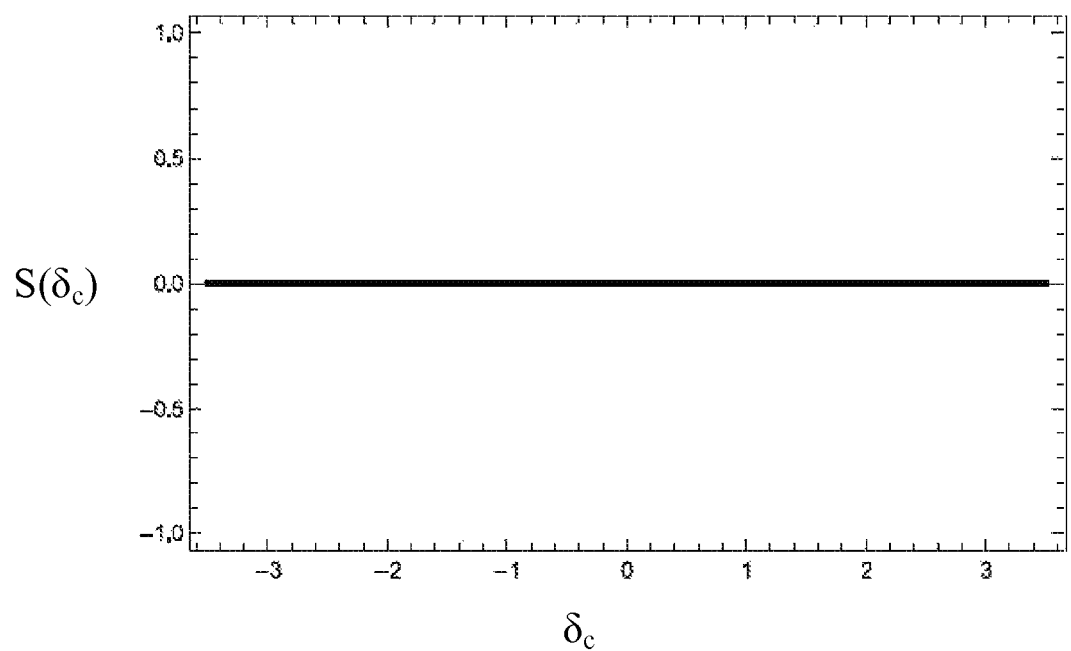
Figure 6D:
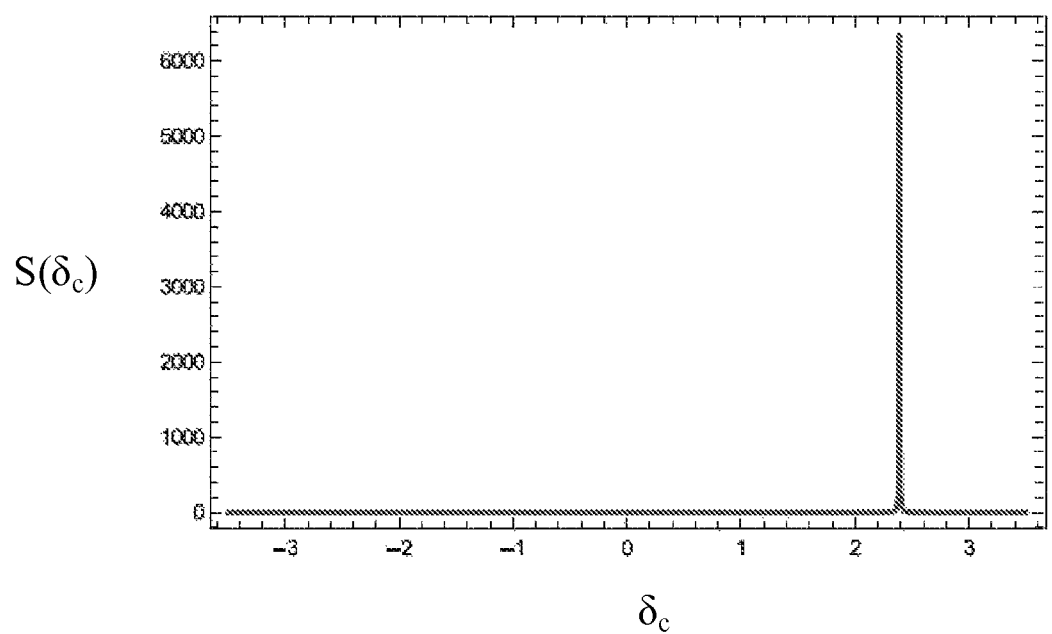
Figure 6E:
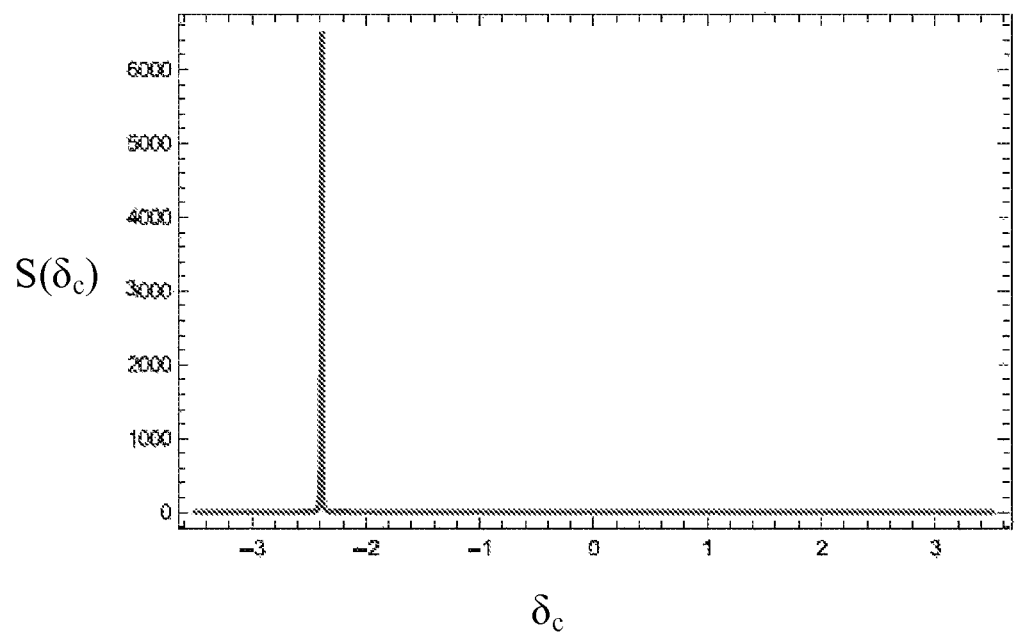
Figure 6F:
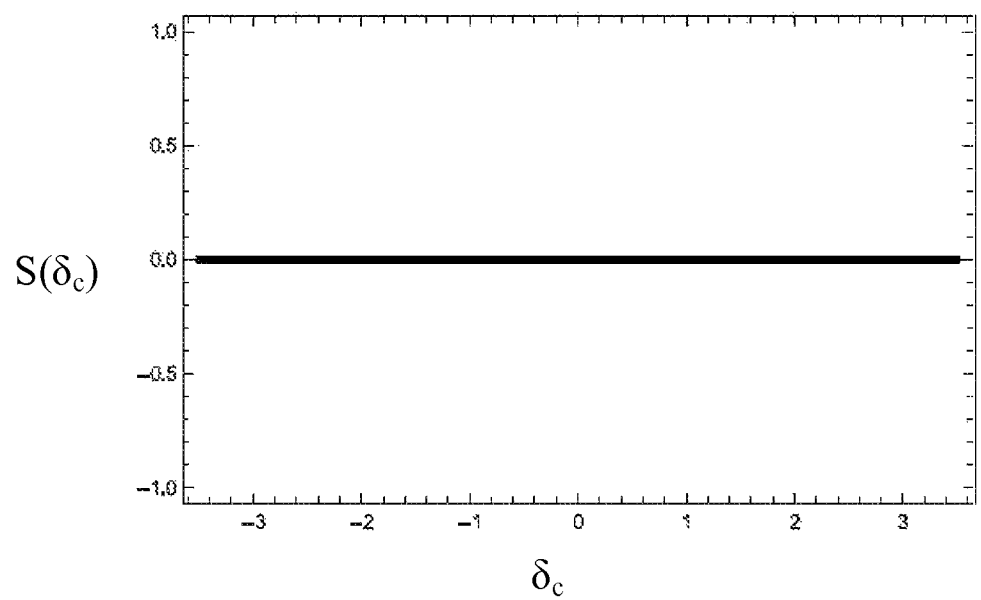

In an exemplary embodiment when referring to Equation 1, a high-powered laser system may have phases of $\phi 2$ equal to $\pi$ and $\phi 3$ equal to 0 (or phases of $\phi 2$ equal to 0 and $\phi 3$ equal to $\pi$) as well as intensities of $|\Omega_{m1, m2, O1, O2}|$, equal to $1\Gamma$. For example, if $\Gamma$ is 10 MHz, then $|\Omega_{m1, m2, O1, O2}|$ is 10 MHz. Under these conditions, the dynamics of the atoms of the gain medium 102 may behave as shown in FIG. 6C. In an exemplary embodiment when referring to Equation 1, a laser system has phases of $\phi 2$ equal to $\pi$ and $\phi 3$ equal to 0 (or phases of $\phi 2$ equal to 0 and $\phi 3$ equal to $\pi$) as well as intensities of $|\phi_{m1, m2}|$ equal to $1\Gamma$ and $|\Omega_{O1, O2}|$equal to $2\Gamma$. For example, if $\Gamma$ is 10 MHz, then $|\Omega_{m1, m2}|$ is 10 MHz and $|\Omega_{O1, O2}|$is 20 MHz. Under these conditions, the dynamics of the atoms of the gain medium 102 may behave as shown in FIG. 6F. Thus, as shown by FIGS. 6C and 6F the gain medium 102 may behave similarly even under different field intensities (e.g., optical lasers at $2\Gamma$ and masers at $1\Gamma$ or all masers and lasers at $1\Gamma$). In both situations, the laser system may operate in the domain of the trapping condition where the brighten atoms of the gain medium 102 are darkened. In other words, the excited atoms of the gain medium 102 will remain excited until the trapping condition is met. With flexibility in the size, geometry, and placement of the gain medium 102 and the mirrors 110a, 110b, it may be possible to achieve power of any required level in sharp laser pulses due to an almost lossless characteristic of the gain medium 102.

Laser Oscillation in the Population Control Domain I

In an exemplary embodiment when referring to Equation 1, a laser system may have applied fields with the following conditions: ($\phi 2$ is $\pi/2$, $\phi 3$ is $3\pi/2$, $|\Omega_{O2, O1}|$ is $0.5\Gamma$, and $|\Omega_{m2, m1}|$ is $\Gamma$. For example, if $\Gamma$ is 10 MHz, then $|\Omega_{O2, O1}|$ is 5 MHz and $|\Omega_{m2, m1}|$ is 10 MHz. Under these conditions, lasing action from the created excited energy level for the laser oscillation may appear as shown in FIG. 6A.

The narrowed spectral line may correspond to a very slow decay rate, which may be on the order of $10^2$ less than the natural decay rate. The excited state is in a meta-stable state with a decay rate of $10^{-8}$/s. The total control of the atomic population at the corresponding atom-field created state may decay with the rate of $10^{-6}$/s, which is a significantly slower decay rate than a meta-stable state. The population inversion condition in domain I and in domains II, III, and IV is required unlike the requirements for the high-power pulse laser oscillation in the darkened atomic medium domain.

Laser Oscillation in the Population Control Domain II

In an exemplary embodiment when referring to Equation 1, a laser system may have applied fields with the following conditions: $\phi 2$ is $3\pi/2$, $\phi 3$ is $\pi/2$, $|\Omega_{O1, O2}|$ is $0.5\Gamma$, and $|\Omega_{m1, m2}|$ is $\Gamma$. For example, if $\Gamma$ is 10 MHz, then $|\Omega_{O2, O1}|$ is 5 MHz and $|\Omega_{m2, m1}|$ is 10 MHz. Under these conditions, lasing action from the created excited energy level for the laser oscillation may appear as shown in FIG. 6B. A narrowed spectral of domain II may also correspond to the slowest decay rate, similar to domain I.

Laser Oscillation in the Population Control Domain III

In an exemplary embodiment when referring to Equation 1, a laser system may have applied fields with the following conditions: $\phi 2$ is $3\pi/2$, $\phi 3$ is $\pi/2$, $|\Omega_{m1, m2, O2}|$ is $\Gamma$, and $|\Omega_{O1}|$ is $0.1\Gamma$. For example, if $\Gamma$ is 10 MHz, then $|\Omega_{m1, m2, O2}|$ is 10 MHz and $|\Omega_{O1}|$ is 1 MHz. Under these conditions, lasing action from the created excited energy level for the laser oscillation may appear as shown in FIG. 6D. The narrow spectral line of domain III may also correspond to the slowest decay rate similar to domain I. The lasing action may correspond to the created energy level for the laser oscillation in the system.

Laser Oscillation in the Population Control Domain IV

In an exemplary embodiment when referring to Equation 1, a laser system may have applied fields with the following conditions: $\phi 2$ is $\pi/2$, $\phi 3$ is $3\pi/2$, $|\Omega_{m1, m2, O2}|$ is $\Gamma$, and $|\Omega_{O1}|$ is $0.1\Gamma$. For example, if $\Gamma$ is 10 MHz, then $|\Omega_{m1, m2, O2}|$ is 10 MHz and $|\Omega_{O1}|$ is 1 MHz. Under these conditions, lasing action from the created excited energy level for the laser oscillation may appear as shown in FIG. 6E. A narrow spectral line of domain IV may also correspond to the slowest decay rate similar to domain I. The lasing action may correspond to the created energy level for the laser oscillation in the system.

Envisioned exemplary embodiments of laser systems are based on two different mechanisms. One mechanism is the contrast-Q-switch mechanism. Another mechanism is the Q-switch mechanism. Each is discussed below.

In an exemplarily embodiment, the laser system is based on the contrast-Q-switch mechanism. The contrast-Q-switch mechanism depends on the trapping condition. More specifically, the intensities of the driving lasers (e.g., lasers 103a and 103b) and masers (e.g., 104a and 104b) may be kept constant to satisfy the trapping condition while the phases of the two optical fields may be controlled to be asymmetric and the phases of the microwave fields may be controlled to be symmetric.

Normally, in a Q-switch mechanism a laser generates giant pulses. With the Q-switching technique, time or irradiance dependent losses may modulate the Q-factor (quality factor) of the resonator. A low Q-factor may correspond to high resonator losses, and vice versa. Losses may be high in a laser cavity having a low Q-factor, and the gain of the laser may be increased to a very high value without lasing action. The losses in the contrast-Q-switch system mechanism may be very small because of the trapped atoms of the gain medium 102 in an excited state.

Population inversion may not be required in this domain due to the trapping condition. However, population inversion may be used to create a higher powered laser. In the laser system of an exemplary embodiment, some losses may appear from Doppler broadening or collision broadening during the lasing processes. In collision broadening, the atoms of the gain medium 102 in the excited state may shift to a nearby hyperfine excited state thereby escaping from the interaction loop of the driving lasers and masers for the spontaneous decay. This action may create small losses to the system. However, these losses may increase if the temperature or pressure of the gain medium 102 increases. Nevertheless, in a reasonable experimental environment, the losses due to Doppler broadening or collision broadening may be minimized.

In an exemplary embodiment, a high gain value may be achieved in a very short time to switch to high Q-factor with the use of the pumping process. Thus, laser oscillation may start very quickly. Once the laser oscillation starts, all the available energy may be emitted in a single pulse. The emission of the pulse decreases as the gain falls below a loss threshold (i.e., the loss in the system from the mirrors 110a, 110b, Doppler broadening, and collisions broadening are too large for the gain to overcome). When the gain fails below the loss threshold, the lasing action may stop. The process may repeat in a very short time in comparison to the traditional Q-switch mechanism.

In an exemplary embodiment, a laser system that is configured to generate large, sharp pulses may be easy and cost effective to manufacture due to the time control of the pump laser and the controllability of the trapping condition. More importantly, such a laser system may offer an alternative approach to a laser using a traditional Q-switch mechanism. The time control of the pumping mechanism may enable generation of the time controlled pulse. Because the losses in the system are too small to neglect, the generated time-controlled pulses may also appear very sharp. The increase in the power of the generated pulses due to the pulse sharpness may be in addition to the high power capacity of the pulses. The novel approach to lasers using a contrast-Q-switch mechanism is suitable for a wide range of applications. Therefore, a pulse laser system based FGC may be adjustable to any required temporally-controlled high-power sharp pulses as long as the size of the gain medium 102 and the geometry of the mirrors 110a, 110b of the laser cavity 100 are adjustable.

The population control domains (I-IV) are similar to a laser system based on a meta-stable state. Nevertheless, the decay rate may be the slowest in a pulse laser source of high power and high stability than the pulse laser sources of the ordinary meta-stable states. The operation mechanism of these domains may be different from the case of domain I. In fact, no population trapping of the gain medium 102 occurs and the population may be controlled in their corresponding atom-field created states. Further, due to FGC, the emission probabilities may be slowed by a factor of 100 caused by the spectral narrowing. This slowed decay may be on top of the meta-stability $10^{-8}$/s of the excited state of the sodium as the gain medium 102. Therefore, the population decay process may be slowed to $10^{-6}$/s, a remarkable slow decay rate compared with the natural decay rate. The significantly slow decaying atomic population of the gain medium 102 in these domains of slightly different optical lasing frequencies in addition to the population inversion may be used in a laser using a Q-switch mechanism, as shown in FIG. 2, or a mode-locked laser, as shown in FIGS. 3 and 4.

Here, we highlight some aspects of a Q-switch mechanism. In the domains of (I-IV), the losses in the system are larger than the atomic darkened domain. Because the trapping condition is not met, the switching process for oscillation of the laser is similar to a traditional Q-switch mechanism. The Q-switching to the gain action may be achieved in a time limit of approximately equivalent to the ratio of the losses in the two processes of population control and trap. In fact, due to the larger losses in operating domains (II-V), the power of the generating pulses is lowered by the same ratio equivalent to their losses. Further, the degradation of sharpness of the generated pulses in these domains also occurs.

In an exemplary embodiment, a high-powered pulse laser may include a gain medium 102 with a hyperfine structured Sodium atomic medium in a weak magnetic field. In an exemplary embodiment, a high contrasted-Q-switch resonator is easy to generate and temporally control laser pulses of high power with almost no losses during the lasing process without the need for population inversion of atoms of the gain medium 102.

When the geometry of the gain medium 102 and mirrors 110a, 110b is flexible, a time controlled pulse of any required strength may be generated by the proposed device. Furthermore, the slowest decaying atomic population at four different atom-field-created energy-states of the unique decaying level (meta-stable) exhibits a Q-switch like resonator with the condition of population inversion for the pulse laser oscillation using relatively low amounts of power. The low power and the high power pulses generated by the lossless mechanism of the field generated coherence may potentially be applied to biological sciences, astrophysics, and plasma physics.

Although not illustrated, a controller may be utilized to control various aspects of the laser systems of the exemplary embodiments. For instance, the controller may be configured to control the particular phases selected by the phase selectors 105a, 105b, 106a, and 106b, the particular intensities selected by the intensity selectors of first laser, second laser, first maser, and second maser 107, 103a, 103b, 103a, and 104b. The controller may also control the intensity, phase, and frequency of the pump source. The controller may also control the operation of the Q switch 208, the modulator 315, the polarizer 314, the driver 320, and/or the absorber 418, and the like. Alternatively, any component described may have a separate internal controller (e.g., the driver 320 may have a controller that controls the modulator 316). As such, the various components of the laser systems (including the controller) may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, etc. To this end, one or more components of the laser systems of the exemplary embodiments may be associated with one or more controllable features, such as actuators, motors, pumps, phase selectors, intensity selectors, frequency selectors, etc., to enable the laser systems to be modified to achieve the desired results (e.g., satisfy Equation 1).

According to one or more exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, the laser systems may include or otherwise be associated with one or more memories (not shown) including code (e.g., instructions) configured to cause one or more components of the laser systems to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire, and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Although this application describes and illustrates a hyperfine structured Sodium D1 line for use with a system and mechanism of operating a high power pulse laser with the use of field generated coherence, it is envisioned that other suitable atomic elements or molecular compounds may be used.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:
1. A laser system, comprising:
a laser cavity;
a gain medium disposed in the laser cavity;
a pump configured to excite an atom of the gain medium to an excited state;
a first laser configured to couple a first sub-level of the atom of the gain medium to the excited state by applying a first optical field to the gain medium;

a second laser configured to couple a second sub-level of the atom of the gain medium to the excited state by applying a second optical field to the gain medium; and a first maser configured to couple the first sub-level of the atom of the gain medium to a third sub-level by applying a first microwave field to the gain medium; and a second maser configured to couple the second sub-level of the atom to the gain medium to the first sub-level by applying a second microwave field to the gain medium, wherein the pump is configured to excite the atom of the gain medium from a fourth sub-level to the excited state.

2. The laser system of claim 1, wherein the pump comprises a laser pump.

3. The laser system of claim 2, wherein the gain medium comprises atomic sodium.

4. The laser system of claim 3, wherein:
the first laser is configured to generate the first optical field at a Rabi frequency in the range of about 3500 MHZ to about 7500 MHz;
the second laser is configured to generate the second optical field at a Rabi frequency in the range of about 35000 MHZ to about 75000 MHz;
the first maser is configured to generate the first microwave field at a Rabi frequency in the range of about 500 MHz to about 3000 MHz; and
the second maser is configured to generate the second microwave field at a Rabi frequency in the range of about 50 MHz to about 300 MHz.

5. The laser system of claim 4, further comprising:
a first optical phase selector configured to select a first optical phase of the first optical field;
a second optical phase selector configured to select a second optical phase of the second optical field;
a first microwave phase selector configured to select a first microwave phase of the first microwave field; and
a second microwave phase selector configured to select a second microwave phase of the second microwave field.

6. The laser system of claim 5, wherein:
the first optical phase selector and the second optical phase selector are configured to select the first optical phase that is asymmetric to the second optical phase, and
the first microwave phase selector and the second microwave phase selector are configured to select the first microwave phase that is symmetric to the second microwave phase.

7. The laser system of claim 5, wherein:
the first optical phase selector and the second optical phase selector are configured to select the first optical phase that is symmetric to the second optical phase; and
the first microwave phase selector and the second microwave phase selector are configured to select the first microwave phase that is asymmetric to the second microwave phase.

8. The laser system of claim 5, wherein atoms of the gain medium are configured to lase without population inversion between two eigenstates.

9. The laser system of claim 4, further comprising:
a first optical intensity selector configured to select a first optical intensity of the first optical field;
a second optical intensity selector configured to select a second optical intensity of the s second optical field;

a first microwave intensity selector configured to select a first microwave intensity of the first microwave field; and
a second microwave intensity selector configured to select a second microwave intensity of the second microwave field.

10. A laser system, comprising:
a laser cavity;
a gain medium disposed in the laser cavity;
a pump configured to excite an atom of the gain medium to an excited state;
a first laser configured to couple a first sub-level of the atom of the gain medium to the excited state by applying a first optical field to the atom of the gain medium;
a second laser configured to couple a second sub-level of the atom of the gain medium to the excited state by applying a second optical field to the atom of the gain medium;
a first maser configured to couple the first sub-level of the atom of the gain medium to a third sub-level by applying a first microwave field to the atom of the gain medium;
a second maser configured to couple the second sub-level of the atom to the gain medium to the first sub-level by applying a second microwave field to the atom of the gain medium;
a first optical phase selector configured to select a first optical phase of the first optical field;
a second optical phase selector configured to select a second optical phase of the second optical field;
a first microwave phase selector configured to select a first microwave phase of the first microwave field; and
a second microwave phase selector configured to select a second microwave phase of the second microwave field.

11. The laser system of claim 10, wherein:
the first optical phase selector and the second optical phase selector are configured to select the first optical phase that is asymmetric to the second optical phase; and
the first microwave phase selector and the second microwave phase selector are configured to select the first microwave phase that is symmetric to the second microwave phase.

12. The laser system of claim 10, wherein:
the first optical phase selector and the second optical phase selector are configured to select the first optical phase that is symmetric to the second optical phase; and
the first microwave phase selector and the second microwave phase selector are configured to select the first microwave phase that is asymmetric to the second microwave phase.

13. The laser system of claim 10, wherein the laser system comprises a Q-switch laser or a mode-locked laser.

14. The laser system of claim 10, wherein the laser system comprises a Q-switch laser or a mode-locked laser.

15. The laser system of claim 10, further comprising a Q-switch disposed in the laser cavity.

16. The laser system of claim 10, further comprising:
a modulator disposed in the laser cavity;
a polarizer disposed in the laser cavity; and
a driver configured to drive the modulator.

17. The laser system of claim 10, further comprising an absorber disposed in the laser cavity.

* * * * *